US009957987B2

(12) United States Patent
Wandkowski et al.

(10) Patent No.: US 9,957,987 B2
(45) Date of Patent: May 1, 2018

(54) DRAINAGE BODY CONNECTING ELEMENT

(71) Applicant: ACO Severin Ahlmann GmbH & Co. KG, Budelsdorf (DE)

(72) Inventors: Marco Wandkowski, Kronshagen (DE); Jan Mieze, Kiel (DE); Thorsten Wichmann, Schonberg (DE)

(73) Assignee: ACO SEVERIN AHLMANN GMBH & CO. KG, Budelsdorf (DE)

( * ) Notice: Subject to any disclaimer, the term of this patent is extended or adjusted under 35 U.S.C. 154(b) by 321 days.

(21) Appl. No.: 14/374,008

(22) PCT Filed: Jan. 23, 2013

(86) PCT No.: PCT/EP2013/051183
§ 371 (c)(1),
(2) Date: Jul. 23, 2014

(87) PCT Pub. No.: WO2013/110629
PCT Pub. Date: Aug. 1, 2013

(65) Prior Publication Data
US 2015/0016874 A1    Jan. 15, 2015

(30) Foreign Application Priority Data
Jan. 24, 2012    (DE) .................. 10 2012 100 560

(51) Int. Cl.
*F16B 5/00*      (2006.01)
*E03F 1/00*      (2006.01)
(Continued)

(52) U.S. Cl.
CPC ............ *F16B 5/0004* (2013.01); *E02B 11/00* (2013.01); *E03F 1/00* (2013.01); *E03F 1/005* (2013.01);
(Continued)

(58) Field of Classification Search
CPC ......... Y10T 24/44026; Y10T 24/45005; Y10T 403/70; Y10T 403/7039; Y10T 403/7045;
(Continued)

(56) References Cited

U.S. PATENT DOCUMENTS 5,941,660 A * 8/1999 Rueckert ............... B63C 1/02
114/263
6,736,569 B2 * 5/2004 Lee ....................... E02D 31/06
405/43
(Continued)

FOREIGN PATENT DOCUMENTS

AT        508366 B1 * 1/2011 ............. E03F 1/005
AT        509 154 A1    6/2011
(Continued)

OTHER PUBLICATIONS

English translation of Written Opinion for PCT Application No. PCT/EP2013/051183, dated Jul. 29, 2014, 7 pages.
(Continued)

*Primary Examiner* — Matthieu F Setliff
*Assistant Examiner* — Matthew R McMahon
(74) *Attorney, Agent, or Firm* — Westman, Champlin & Koehler, P.A.

(57) ABSTRACT

Trench drains are hollow or grid-like bodies which can be installed in the ground and are intended to receive precipitated surface water and slowly dissipate it into the ground or to store the water. These hollow or grid-like bodies are constructed from individual drainage bodies which must be firmly connected together. Drainage body connecting elements are proposed for connecting drainage bodies, which comprise two pegs which are connected via a web and can each be inserted in a receiving orifice of a drainage body so the two drainage bodies can be connected together via the web.

16 Claims, 10 Drawing Sheets

(51) Int. Cl.
  *E02B 11/00* (2006.01)
  *F16B 5/06* (2006.01)
(52) U.S. Cl.
  CPC .... *F16B 5/0607* (2013.01); *F16B 2005/0678* (2013.01); *Y10T 403/55* (2015.01)
(58) Field of Classification Search
  CPC .... Y10T 403/55; Y10T 403/553; E03F 1/005; F16B 5/0004; F16B 2005/0678; F16B 5/0607; E01C 3/006
  USPC ............................................ 403/292; 405/45
  See application file for complete search history.

(56) References Cited

U.S. PATENT DOCUMENTS

| | | | | |
|---|---|---|---|---|
| 6,802,668 | B2* | 10/2004 | Parker | E02D 31/02 405/49 |
| 7,048,243 | B1* | 5/2006 | Steinman | A47J 36/34 248/152 |
| 7,225,751 | B2* | 6/2007 | Rueckert | B63B 3/08 114/259 |
| 8,162,567 | B2* | 4/2012 | Obermeyer | E03F 1/002 405/43 |
| 8,696,241 | B2* | 4/2014 | Lee | E01C 13/083 404/36 |
| 9,631,328 | B2* | 4/2017 | van Raam | E01C 13/08 |
| 2003/0219310 | A1* | 11/2003 | Burnes | E03F 1/003 405/39 |
| 2006/0272566 | A1* | 12/2006 | Rueckert | B63B 3/08 114/263 |
| 2007/0227094 | A1* | 10/2007 | Oscar | B65D 90/023 52/630 |
| 2008/0149188 | A1* | 6/2008 | Zimmerman | E03B 3/03 137/236.1 |
| 2009/0250369 | A1* | 10/2009 | Guibert | E03F 1/002 206/507 |
| 2010/0021236 | A1* | 1/2010 | Kreikemeier | E03F 1/005 405/55 |
| 2011/0108559 | A1* | 5/2011 | Hewing | E02B 11/005 220/694 |
| 2012/0141203 | A1* | 6/2012 | Gooden | A01G 13/0237 404/41 |
| 2012/0163911 | A1* | 6/2012 | Culleton | E01C 5/22 404/41 |
| 2012/0255624 | A1* | 10/2012 | Canney | E02B 11/005 137/315.01 |
| 2014/0291221 | A1* | 10/2014 | Adams | E03F 3/046 210/170.03 |

FOREIGN PATENT DOCUMENTS

| | | | |
|---|---|---|---|
| CN | 1944823 A | 4/2007 | |
| DE | 203 03 343 U1 | 6/2003 | |
| DE | 10 2009 044 412 A1 | 4/2011 | |
| EP | 1416099 A2 * | 5/2004 | ............ E03F 1/005 |
| EP | 1743984 A1 * | 1/2007 | ............ E03B 3/03 |
| EP | 2687642 A1 * | 1/2014 | ............ E03F 1/005 |
| GB | 2 417 733 A | 3/2006 | |
| UA | 90111 U | 5/2014 | |
| WO | 2011/089690 A1 | 7/2011 | |

OTHER PUBLICATIONS

International Search Report and Written Opinion for PCT Application No. PCT/EP2013/051183, dated May 2, 2013, 8 pages.
German Office Action for German Patent Application No. 10 2012 100 560.5, dated Nov. 27, 2012, 5 pages.
First Chinese Office Action for Chinese Patent Application No. 201380006398.3, dated Apr. 23, 2015, 6 pages.
Decision of Grant for Ukrainian Patent Application No. a201409317, dated Sep. 21, 2016, 6 pages.

* cited by examiner

DRAINAGE BODY CONNECTING ELEMENT

CROSS-REFERENCE TO RELATED APPLICATION

This Application is a Section 371 National Stage Application of International Application No. PCT/EP2013/051183, filed 23 Jan. 2013 and published as WO 2013/110629 A1 on 1 Aug. 2013, in German, the contents of which are hereby incorporated by reference in their entirety.

BACKGROUND OF THE INVENTION

The invention concerns a drainage body connecting element for connecting drainage bodies, i.e. hollow or grid-like bodies which can be installed in the ground and are intended to receive precipitated surface water and slowly dissipate it into the ground or to store the water.

DESCRIPTION OF THE RELATED ART

Surface water, which often occurs in large volume flows, is generally discharged into the public drainage network. Charges are levied for such water drainage. To enable this surface water to seep into the ground, trench drains are known, i.e. constructions which are installed in the ground and can often receive very large volumes of surface water which then dissipates into the ground. Such trench drains are constructed from individual bodies which are connected together. These constructions must be very stable since often, vehicles must drive over the surface below which the drain is installed. For this, not only must the individual bodies from which the drain is constructed be stable, but the connections between the individual bodies must also be stable in order to give the entire construction the necessary stability. Furthermore, it is necessary for the drainage body connecting elements not only to have the necessary strength, but they must also be simple and economic to produce and easy to install.

SUMMARY OF THE INVENTION

The invention is based on the object of producing a drainage body connecting element which guarantees a high connection strength and a precise alignment between drainage bodies, but nonetheless is economic and simple to install.

This object is achieved by a drainage body connecting element according to claim 1.

In particular, this object is achieved by a drainage body connecting element for connecting drainage bodies, comprising two pegs connected via a web, each of which can be placed in a receiving orifice of a drainage body so that two drainage bodies are connected together via the web. Such a construction is easy to produce, easy to install and also durable.

Preferably the pegs can be locked in the receiving orifices. This ensures that when loads are applied perpendicular to the casing surfaces of the pegs, these cannot be squeezed out of the receiving orifices.

Preferably the pegs are formed tapering towards a lower end on their outer faces, and preferably have a protruding upper edge at an opposing upper end, which edge can in particular be inserted by form fit in the receiving orifice. In particular when made by injection moulding, the conical form is particularly suitable for removal of the drainage body connecting elements from the mould.

Preferably the drainage body connecting elements have first locking devices via which a first drainage body connecting element can be connected to a second, such that the first drainage body connecting element can be mounted in a first drainage body either flush or countersunk in relation to its surface, and the second drainage body connecting element can be mounted on the first drainage body connecting element protruding above the surface of the drainage body. By means of this arrangement, firstly one connection of two adjacent drainage bodies, smooth surfaces can be produced i.e. surfaces without protruding drainage body connecting elements. Secondly, when drainage bodies are stacked on top of each other, the upper drainage bodies can be fixed to the lower drainage bodies in the horizontal direction via the protruding drainage body connecting elements (no fixing in the vertical direction is required). Here it is of particular advantage that the first and second drainage body connecting elements are formed identically, so that only a single type of drainage body connecting element need be produced.

In a first embodiment of the invention, the pegs can be pushed into each other and locked together in this position. This gives a very stable construction in a simple manner.

In a second embodiment of the invention, the pegs can be locked together at their ends. This gives not only a simple construction but rather, even longer connecting elements can be produced for connecting drainage bodies which are stacked on top of each other.

In the first embodiment, the first locking devices are preferably configured such that the pegs can be connected both to each other and to the drainage bodies via these first locking devices. This construction is particularly simple.

In the second embodiment, it is advantageous if the first locking devices are configured to connect the pegs together and the second locking devices are provided for connecting the pegs to the drainage bodies. This achieves said extended construction in a simple manner.

The pegs are preferably configured so that they can be inserted either with lower ends in the receiving orifices countersunk into or flush with a surface of the drainage body, or with a second end in the receiving orifice protruding from the surface of the drainage body. This achieves an increased variability of usage of the drainage body connecting elements.

In order to connect together at their edges drainage bodies which are stacked on top of each other, for each drainage body connecting element only two pegs pushed into each other or two pegs attached to each other are required. In order not to have to create separate drainage body connecting elements for this application, it is advantageous if the web can be separated from the pegs or in particular can be separated in the middle. Thus uniform drainage body connecting elements produced with pegs can be converted into edge connecting elements.

Advantageously, because of the variability of the drainage body connecting element according to the invention, three different connection types can be achieved with this component, namely connection of adjacent drainage bodies, connection of drainage bodies stacked on top of each other, and connection of two adjacent drainage bodies and two drainage bodies stacked on top of each other.

Preferably the drainage body connecting element is produced as an injection moulding, in particular made of plastic, wherein the pegs (in some cases, also the webs) are formed as hollow bodies. This achieves a considerable material saving without substantially reducing the strength of the drainage body connecting element.

BRIEF DESCRIPTION OF THE DRAWINGS

Embodiments of the invention are explained below in more detail with reference to drawings. The drawings show.

DESCRIPTION OF THE PREFERRED EMBODIMENTS

In the description below, the same reference numerals are used for the same parts and those with the same effect.

In the first preferred embodiment of the drainage body connecting element shown in detail in FIGS. 1 to 6, two such drainage body connecting elements 1 and 2 are pushed into each other or stacked together. The two drainage body connecting elements 1, 2 are formed identically as plastic injection mouldings and each have pegs 20, 20' of conical outer form, which run tapering towards lower ends 24, 24'.

Upper edges 23, 23' are provided at upper ends 25, 25' and protrude outward in the form of flanges.

Pegs 20, 20' are connected together in pairs via a web 21.

Figure 1:
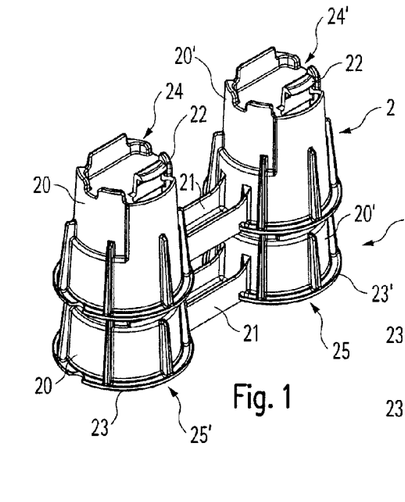
FIG. 1 a perspective view of a first embodiment of the invention.
Figure 2:
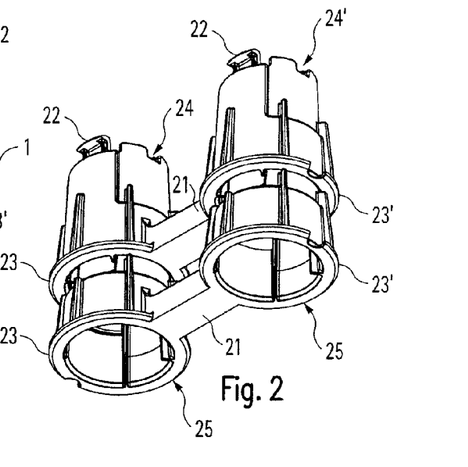
FIG. 2 the arrangement from FIG. 1 in an oblique view from below.
Figure 3:
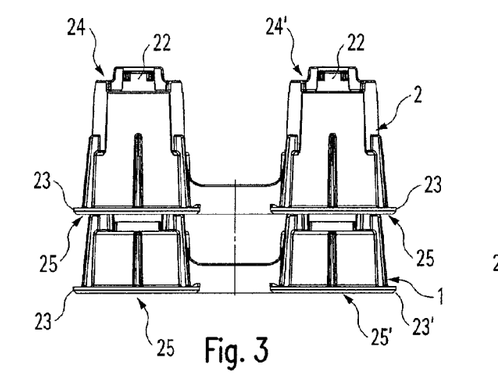
FIG. 3 a side view of the arrangement in FIGS. 1 and 2.
Figure 4:
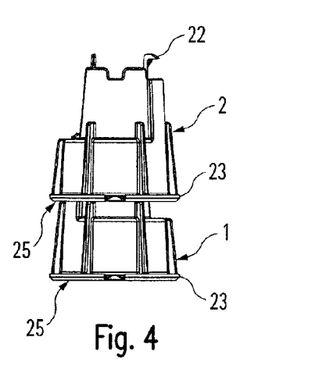
FIG. 4 a front view of the arrangement in FIGS. 1 to 3.
Figure 5:
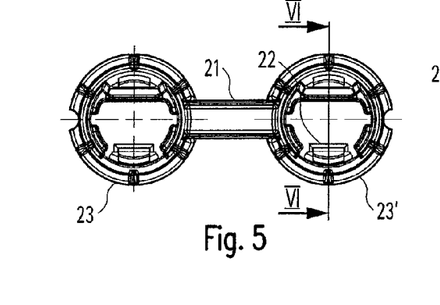
FIG. 5 a bottom view of the arrangement in FIG. 3.
Figure 6:
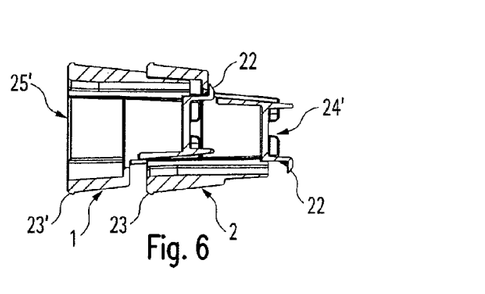
FIG. 6 a section along line VI-VI from FIG. 5.

Furthermore, first locking devices 22 are provided at the lower ends 24, 24' of the pegs 20, 20'. When pushed or stacked in each other as shown in FIGS. 1 and 2, these locking devices 22—as shown in particular in FIG. 6—are in snap engagement with the lower end 24, 24' of the respective upper peg 20, 20', so that the two drainage body connecting elements 1, 2 are stably connected together after the first locking devices 22 have been firmly pushed together and snap-locked. However these locks 22 can also be opened again on corresponding deformation with a tool.

Figures 7, 8:
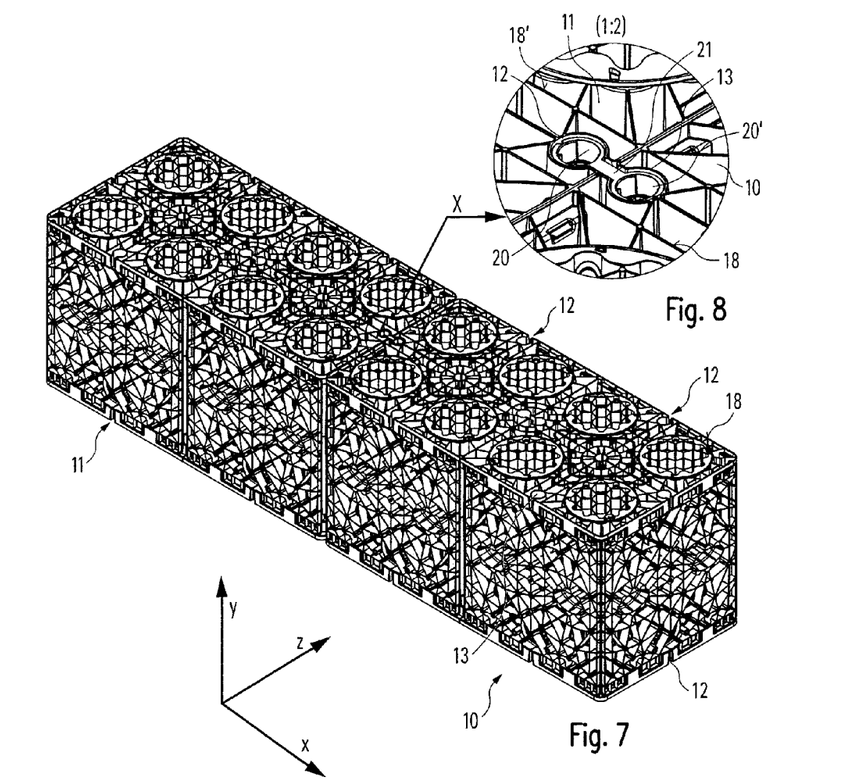
FIG. 7 a perspective view of a drainage body.
FIG. 8 a perspective detail view of a portion of the drainage body from FIG. 7 with a drainage body connecting element in the Y direction (X-Z plane), FIG. 9 a section in the Y-Z plane through the arrangement in FIG. 8, FIG. 10 a section in the X-Y plane through the arrangement in FIG. 8, FIG. 11 a perspective view of a drainage body with two elements stacked on top of each other, FIG. 12 a section in the Y-Z direction through a drainage body connecting element which is arranged inside the drainage body according to FIG. 11, FIG. 13 a section through the drainage body connecting element in FIG. 12 in the X-Y plane, FIG. 14 a perspective detail view in the Z direction (X-Y plane) of the drainage body according to FIG. 11, FIG. 15 a section in the Y-Z plane through the arrangement in FIG. 14, FIG. 16 a section in the X-Y plane through the arrangement in FIG. 14, FIG. 17 a perspective view of two drainage bodies aligned next to each other according to a second embodiment of the invention, FIG. 18 a perspective detail view in the Y direction (X-Z plane) of a middle detail in FIG. 17, FIG. 19 a section in the Y-Z plane through the arrangement in FIG. 18, FIG. 20 a section in the X-Y plane through the arrangement in FIG. 18, FIG. 21 a perspective view of two drainage bodies stacked on top of each other according to the embodiment in FIGS. 17 to 20, FIG. 22 a section through a drainage body connecting element which is arranged in the middle in FIG. 21 and connects two drainage bodies together, FIG. 23 a section through the drainage body connecting element which is arranged in an edge region of the arrangement in FIG. 21, in the X-Y plane, FIG. 24 a perspective detail view in the Z direction (X-Y plane) of the element in FIG. 23, FIG. 25 a section in the X-Y plane of a drainage body connecting element arranged in a middle region of the arrangement in FIG. 21, and FIG. 26 a section through the element in FIG. 21 in the Y-Z plane.
Figure 9:
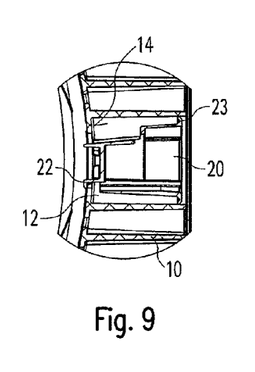
Figure 10:
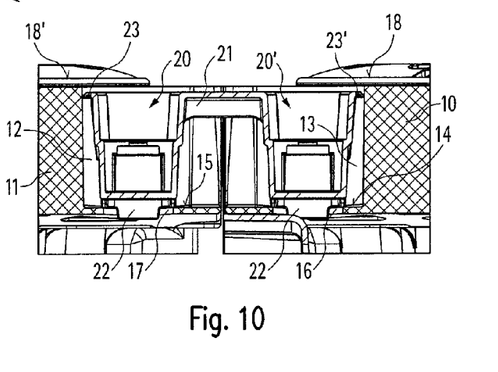
Figure 11:
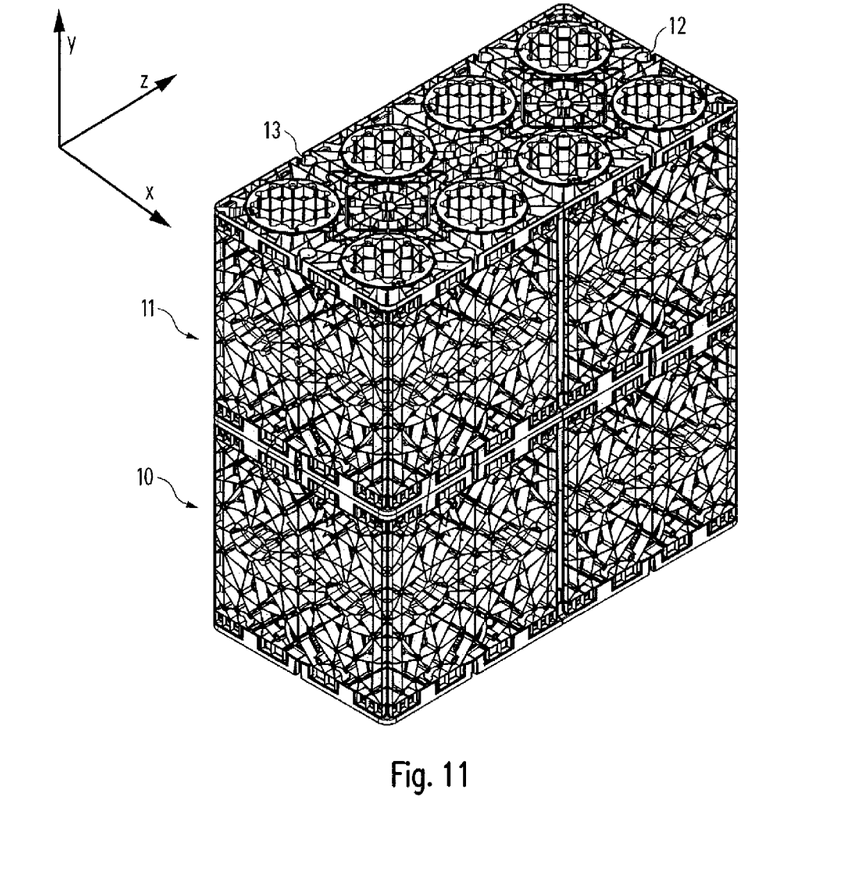
Figure 12:
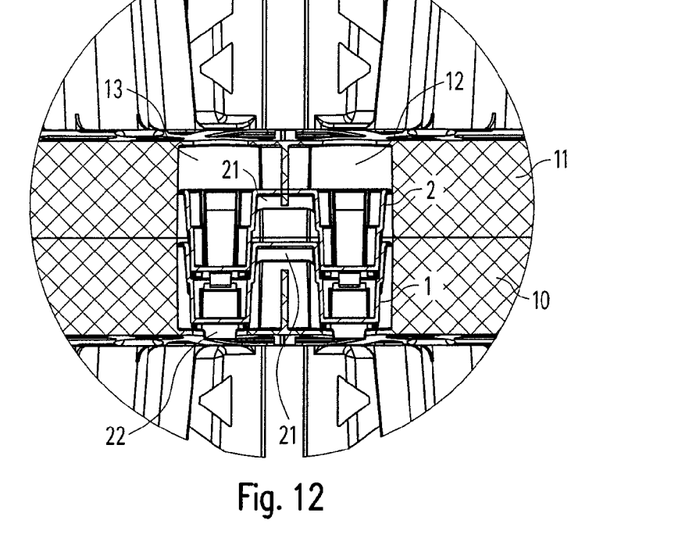
Figure 13:
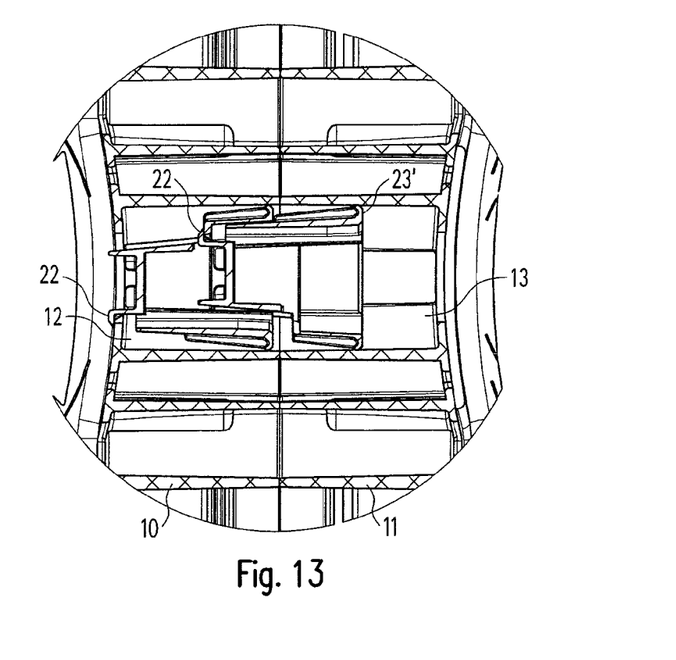
Figure 14:
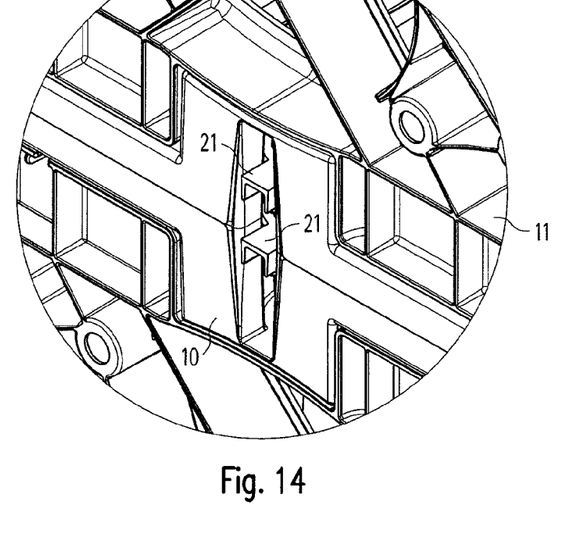
Figure 15:
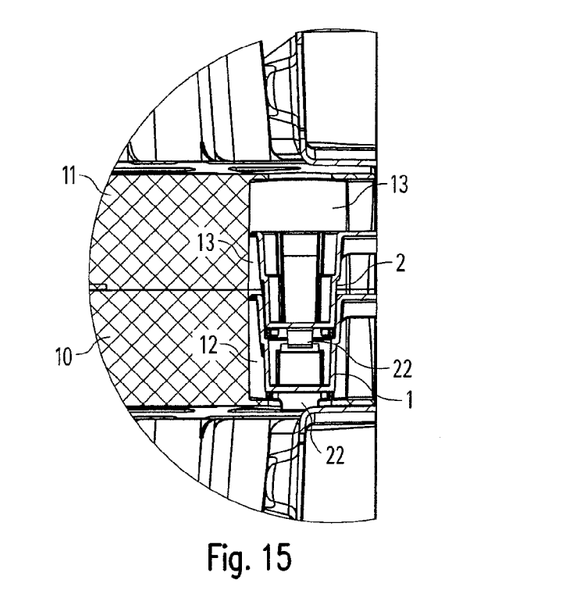
Figure 16:
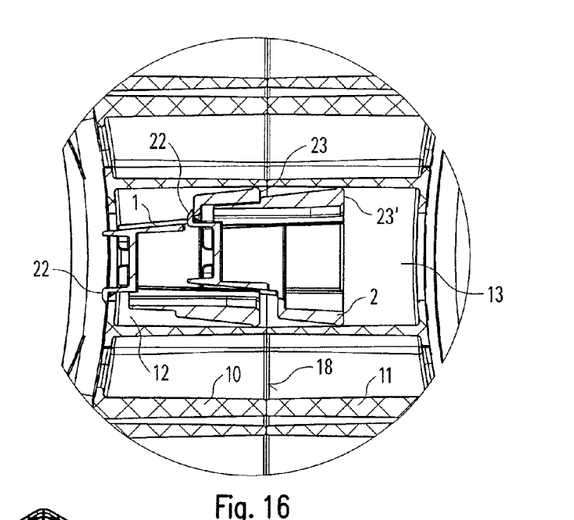
Figure 17:
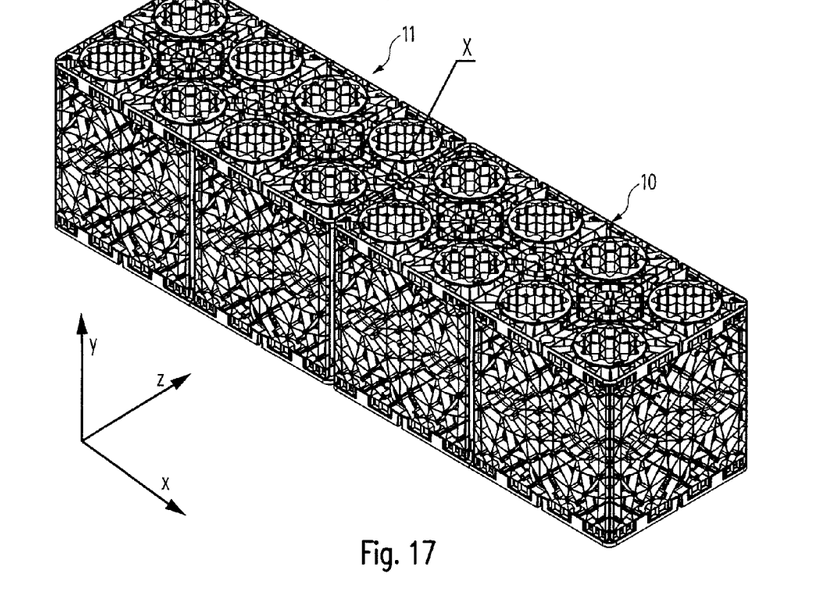

FIG. 7 shows two adjacent drainage bodies 10, 11 with aligned short sides which are connected together via drainage body connecting elements. FIGS. 9 and 10 show different cross sections and FIG. 8 shows a perspective detail view of a drainage body connecting element which on the outside is pushed into the receiving orifices 12, 13 between the two drainage bodies 10, 11 substantially flush with a surface 18.

FIGS. 8 to 10 show that the first locking devices 22 protrude through openings in a base 14, 15 of the drainage body 10, 11 and snap-lock there, so that the drainage body connecting elements 1, 2 are firmly locked in the drainage bodies 10, 11.

Whereas the outer faces of the pegs 20, 20' sit freely in the receiving orifices 12, 13, the upper edges 23, 23' stand in form-fit connection with the walls of the recesses 12, 13 so that the two drainage bodies 10, 11 are connected together substantially play-free via the web 21.

FIGS. 11 to 16 show how the drainage body connecting elements 1, 2 connect together two drainage bodies 10, 11 stacked on top of each other.

First, two drainage body connecting elements 1, 2 are stacked on top of each other. As shown in particular in FIGS. 12, 13, 15 and 16, the "lower" drainage body connecting element engages with its pegs 20, 20' so deeply in the one drainage body 10 that it sits in the receiving orifice 12 with its upper edge 23 slightly below the surface 18 of the associated drainage body 10. Furthermore it is secured to the drainage body 10 by its first locking device 22.

The "upper" drainage body connecting element 2 sits in the first drainage body connecting element 1 and is firmly connected to this by its first locking devices 22. With its upper end 25, 25' or upper edge 23', this drainage body connecting element 2 protrudes far above the surface 18 of the drainage body 10 so that the upper drainage body 11 (in FIG. 11) can be placed on the lower drainage body 10 such that its receiving orifice 13 aligns with the receiving orifice 12 of the lower drainage body 10, and the "upper" drainage body connecting element 2 is inserted into the receiving orifice 13 and stands with its upper wall 23' in form-fit engagement with the wall of the orifice 13. This reliably prevents any movement in the X-Z plane, i.e. in the horizontal. It is possible for the "upper" drainage body 11 to be moved in the direction of an "upper" drainage body connecting element 2, in order to bring the "upper" drainage body 11 into connection with the "upper" drainage body connecting element 2. The "upper" drainage body connecting element 2 here serves as an orientation aid for the upper drainage body 11. There is no need to fix the "upper" drainage body connecting element 2 in the upper drainage body 11 since this connection in the vertical direction cannot easily be separated because of gravity and the ground loading the overall arrangement.

A further preferred embodiment of the drainage body connecting element is now described below with reference to FIGS. 17 to 26.

Figure 18:
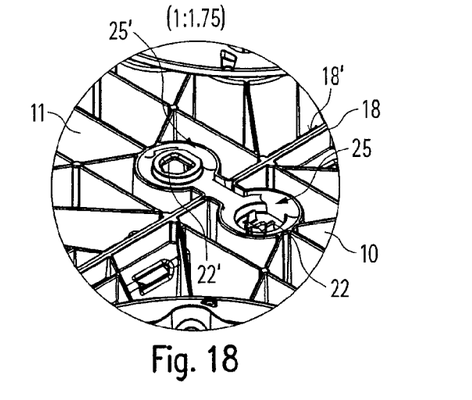
Figure 19:
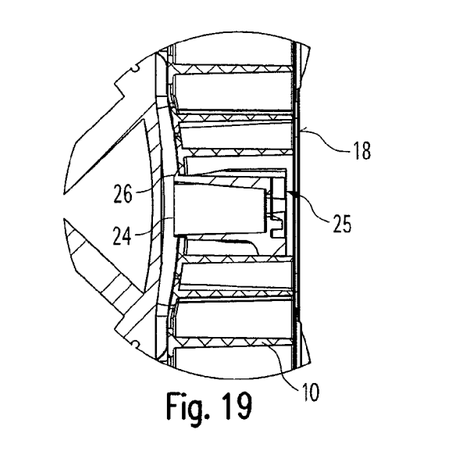
Figure 20:
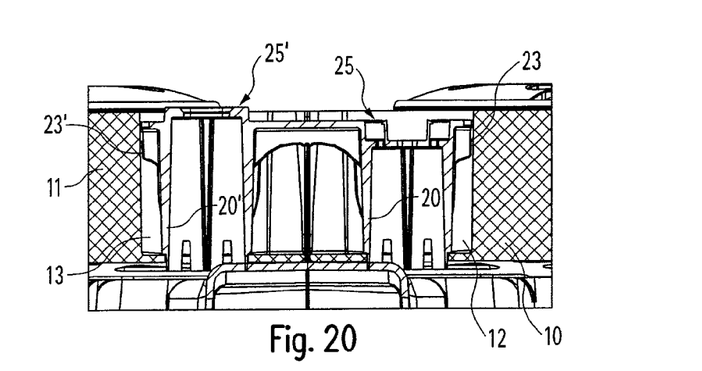
Figure 21:
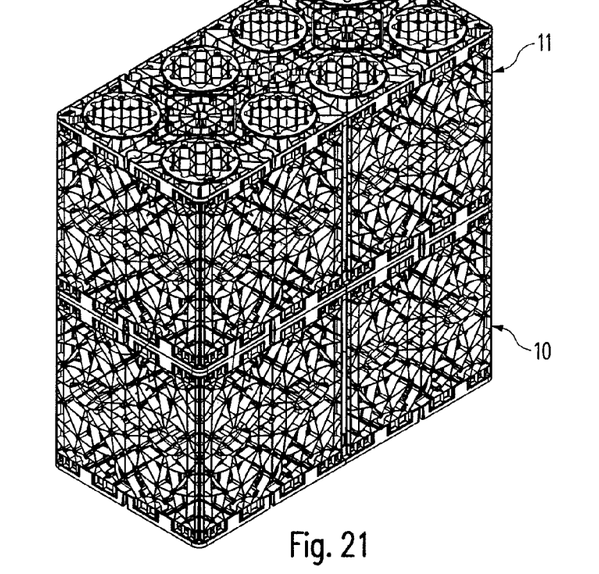
Figure 22:
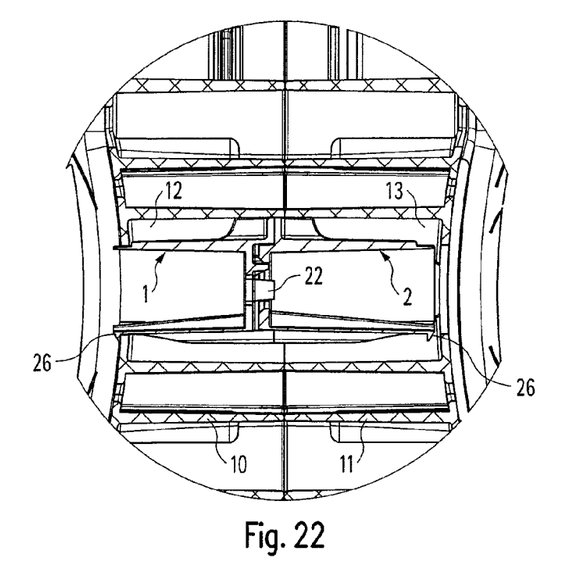

This embodiment of the drainage body connecting element differs from that described above firstly in that the two drainage body connecting elements 1 and 2 are connected at their upper ends 25, 25' (see FIGS. 18 to 20). The first locking devices 22, 22' are provided at these upper ends 25, 25' and allow a snap engagement of two drainage body connecting elements 1 and 2.

Two locking devices 26 are provided at the lower ends 24, 24' and allow a snap engagement with the lower drainage body 10 (see FIGS. 19, 22 and 25), so that the first drainage body connecting element 1 is firmly connected to the drainage body 10. The upper edges 23, 23' are again in form-fit engagement with the walls of the receiving orifices 12, 13 (see FIG. 25).

The pegs 20, 20' are of different lengths, as shown in particular in FIGS. 18 and 20, so that the upper ends 25, 25' of the pegs 20, 20' sit at different depths in the receiving orifices 12, 13. If then two drainage body connecting elements 1, 2 are connected together, as shown for example in FIGS. 22 to 26, the upper edge 23' of the "upper" drainage body connecting element 2 engages both in the receiving orifice 12 of the lower drainage body 10 and in the receiving orifice 13 of the upper drainage body 11 (see FIG. 25) and is there in form-fit engagement with the walls of the receiving orifices 12, 13. This guarantees a maximum strength of the drainage body connecting element against horizontal movement of drainage bodies 10, 11 stacked on top of each other.

Furthermore, in comparison with the previous embodiment, it is easier to place an upper drainage body 11 on a lower drainage body 10 since the thinner lower ends 24' of the "upper" drainage body connecting element 2 protrude over the surface 18 of the lower drainage body 10, and hence there is a relatively large play between the pegs and the walls of the receiving orifice 13. The form-fit engagement takes place only in the region of the upper edges 23, 23' (see in particular FIG. 25).

Figure 23:
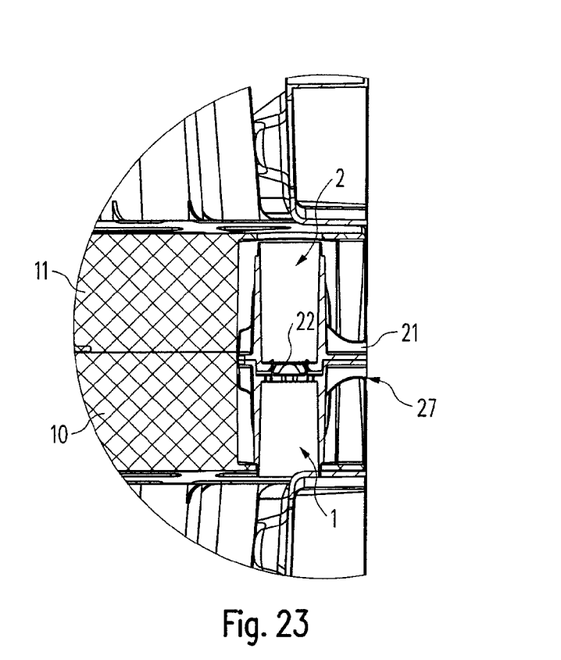
Figure 24:
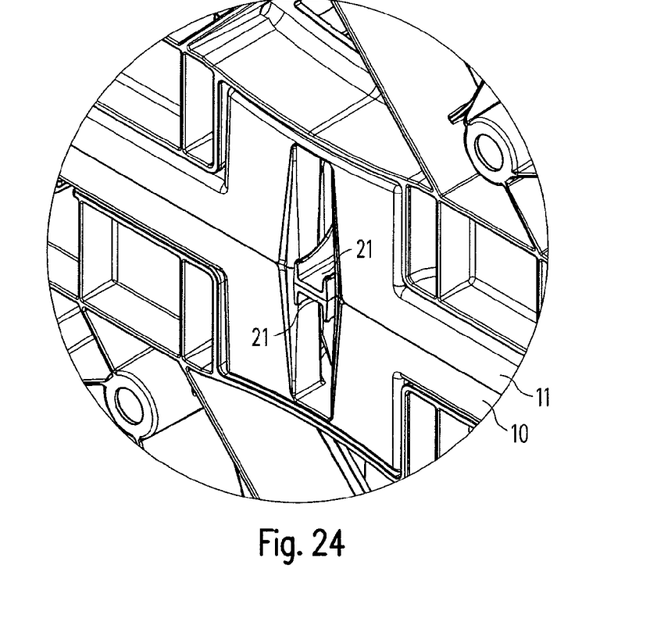
Figure 25:
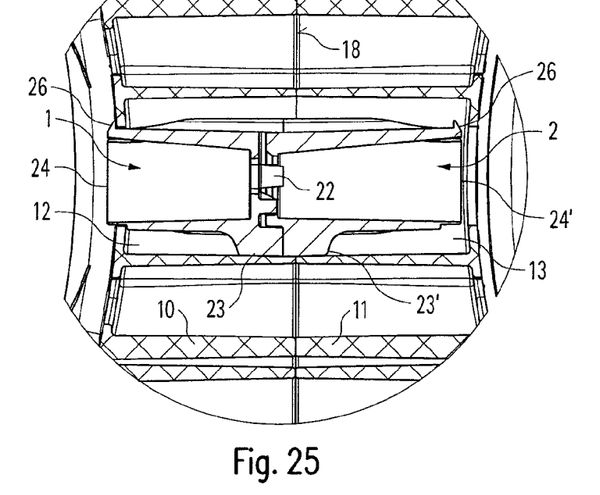
Figure 26:
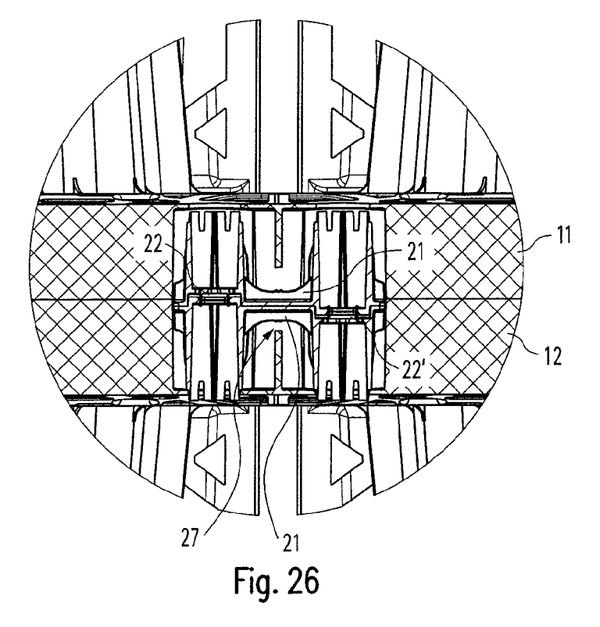

FIGS. 24 and 26 show a further detail in relation to the web 21. This web 21 has a separating notch 27 (see FIG. 26) at which it can be separated, which occurs when (as shown in FIGS. 23 and 24) drainage body connecting elements are installed at the edges and only connect together drainage bodies 10, 11 which are stacked vertically on top of each other. This separation of the web 21 is naturally also guaranteed in the preferred embodiment shown above of the drainage body connecting element.

Both embodiments of the invention described above are also distinguished in that only a single "type" of drainage body connecting element need be produced. By connecting two drainage body connecting elements together, both a flush surface (for edge mounting) or a protrusion of the one drainage body connecting element from the associated receiver orifice, for connecting drainage bodies which are stacked vertically on top of each other, can be guaranteed.

LIST OF REFERENCE NUMERALS

1 Drainage body connecting element
2 Drainage body connecting element
10 Drainage body
11 Drainage body
12 Receiving orifice
13 Receiving orifice
14 Base
18, 18' Surface
20, 20' Peg
21 Web
22 First locking device
23, 23' Upper edge
24, 24' Lower end
25, 25' Upper end
26 Second locking device
27 Separating notch Although the present invention has been described with reference to preferred embodiments, workers skilled in the art will recognize that changes may be made in form and detail without departing from the spirit and scope of the invention.

The invention claimed is:

1. A drainage body system comprising:
   a plurality of drainage bodies, each drainage body including a plurality of receiving orifices; and
   a plurality of connecting elements each comprising:
      two pegs, each of the pegs having an opening at an upper end, and a lower end configured for insertion into a receiving orifice of one of the drainage bodies;
      a web connecting the two pegs; and
      a first locking device;
   wherein:
      insertion of each of the pegs of one of the connecting elements into the receiving orifices of a pair of the drainage bodies connects the pair of drainage bodies together, when the pair of drainage bodies are arranged side by side;
      the upper end of one of the pegs of a first of the connecting elements is configured to sit flush or countersunk to a surface of a first of the drainage bodies when inserted in a receiving orifice of the first drainage body, the pegs of a second of the connecting elements are configured to protrude above the surface when mounted on the first connecting element;
      the lower ends of the pegs of the second of the connecting elements are configured for insertion into the openings of the pegs of the first of the connecting elements, a peg of the second of the connecting elements being received in a receiving orifice of a third of the drainage bodies when arranged above the first of the drainage bodies to thereby connect the third of the drainage bodies to the first of the drainage bodies;
      the first locking device is a snap-lock locking device which locks each of the pegs of the connecting elements vertically in relation to the drainage bodies when inserted into the receiving orifices of a pair of drainage bodies; and
      the first locking device locks two connecting elements together vertically, when the pegs of one of the connecting elements are inserted into the openings of the pegs of the other connecting elements.

2. The drainage body system according to claim 1, wherein
   each of the pegs includes a first locking element at the lower end that is configured to lock the peg in a receiving orifice in which it is inserted.

3. The drainage body system according to claim 2, wherein the upper end of at least one of the pegs of each connecting element includes a second locking device configured to attach to the upper end of a peg of a different connecting element.

4. The drainage body system according to claim 1, wherein each of the pegs has an outer surface that tapers from the upper end toward the lower end, and a protruding upper edge at the upper end, which is configured to be inserted in a receiving orifice of one of the drainage bodies by form-fit.

5. The drainage body system according to claim 1, wherein the plurality of connecting elements are shaped identically to each other.

6. The drainage body system according to claim 1, wherein:
each of the pegs includes the first locking device at the lower end, and a second locking device at the upper end; and
the first locking devices are configured to connect the pegs of different connecting elements together, and the second locking devices are configured to connect the pegs to the drainage bodies.

7. The drainage body system according to claim 1, wherein:
first pegs are configured to be inserted into the receiving orifices of the drainage bodies such that the upper end is flush or countersunk in relation to a surface of the drainage body, and the upper end of second pegs protrude from the surface of the drainage body, the lower ends thereof being inserted into the openings of the first pegs.

8. The drainage body system according to claim 1, wherein
the web of each connecting element is separable from the pegs of the connecting element.

9. The drainage body system according to claim 1, wherein
each of the connecting elements comprise an injection molded plastic body; and
each of the pegs and/or the webs are hollow bodies.

10. A drainage body system comprising:
a plurality of drainage bodies including at least a first drainage body, a second drainage body, and a third drainage body, each drainage body including a receiving orifice; and
a plurality of connecting elements including at least a first connecting element and a second connecting element, each connecting element comprising:
two pegs, each of the pegs having a first end and a second end opposite the first end; and
a web connecting the two pegs;
wherein:
the pegs of the first connecting element are inserted into the receiving orifices of the first and second drainage bodies thereby connecting the first and second drainage bodies together, when said first and second drainage bodies are arranged side by side;
the first end of the peg of the first connecting element that is inserted into the receiving orifice of the first drainage body is flush or countersunk to a surface of the first drainage body;
a slit connecting the receiving orifices of the first and second drainage bodies arranged side by side, the slit receiving the web connecting the pegs of the first connecting element; and
a peg of the second connecting element is received in a peg of the first connecting element and the receiving orifice of the third drainage body, and protrudes above the surface of the first drainage body to thereby connect the first and third drainage bodies together, when the third drainage body is arranged above the first drainage body.

11. The assembly according to claim 10, wherein at least one end of the pegs is flush or countersunk to a surface of the drainage body surrounding the receiving orifice in which the peg is inserted.

12. The assembly according to claim 11, wherein each of the pegs has an outer surface that tapers from the first end toward the second end.

13. The assembly according to claim 12, wherein:
each of the pegs includes an opening at the first end; and
the second ends of the pegs of one connecting element are configured for insertion into the openings of the pegs of another connecting element.

14. The assembly according to claim 10, wherein at least one end of the pegs protrudes from a surface of the drainage body surrounding the receiving orifice in which the peg is inserted.

15. The assembly according to claim 10, wherein each of the pegs includes a locking device at the second end that attaches the peg to the drainage body having the receiving orifice in which the peg is inserted.

16. The assembly according to claim 10, wherein:
each of the pegs includes a first locking device at the first end, and a second locking device at the second end; and
the first locking devices are configured to connect the pegs to the drainage bodies, and the second locking devices are configured to connect the pegs of different connecting elements together.

* * * * *